United States Patent [19]
Luckevich et al.

[11] Patent Number: 5,632,535
[45] Date of Patent: May 27, 1997

[54] DYNAMIC REAR PROPORTIONING BRAKE SYSTEM

[75] Inventors: Mark S. Luckevich, Ann Arbor, Mich.; Mark R. Bielek, Wiesbaden, Germany; Dan Negrin, Windsor, Canada

[73] Assignee: Kelsey-Hayes Company, Livonia, Mich.

[21] Appl. No.: 518,112

[22] Filed: Aug. 28, 1995

[51] Int. Cl.$^6$ ............................. B60T 8/26; B60T 8/60; B60T 8/34
[52] U.S. Cl. ..................... 303/186; 303/113.5; 188/349
[58] Field of Search ........................... 303/186, 187, 303/188, 9.75, 9.62, 113.5; 188/349

[56] References Cited

U.S. PATENT DOCUMENTS

| | | |
|---|---|---|
| 3,980,344 | 9/1976 | Burckhardt . |
| 4,652,060 | 3/1987 | Miyake . |
| 4,699,436 | 10/1987 | Klein . |
| 4,746,173 | 5/1988 | Fennel et al. . |
| 4,826,257 | 5/1989 | Burckhardt et al. . |
| 5,015,040 | 5/1991 | Lin . |
| 5,040,854 | 8/1991 | Arikawa . |
| 5,058,961 | 10/1991 | Mergenthaler et al. . |
| 5,061,017 | 10/1991 | Kirstein . |
| 5,163,742 | 11/1992 | Töpfer et al. . |
| 5,217,287 | 6/1993 | Matsuda . |
| 5,219,210 | 6/1993 | Maehara . |
| 5,281,012 | 1/1994 | Binder et al. . |
| 5,282,674 | 2/1994 | Matsuda . |
| 5,335,935 | 8/1994 | Proos et al. . |
| 5,558,415 | 9/1996 | Buschmann et al. ............... 303/186 |

FOREIGN PATENT DOCUMENTS 0062246 10/1982 European Pat. Off. .
1431466 4/1976 United Kingdom .

*Primary Examiner*—Douglas C. Butler
*Attorney, Agent, or Firm*—MacMillan, Sobanski & Todd

[57] ABSTRACT

A dynamic rear proportioning system is integrated with an existing vehicle anti-lock braking system (ABS) and performs the function of the rear brake pressure proportioning where ABS is not required. The rear brake hydraulic channel (s) are isolated from the master cylinder by activating the rear isolation valves, provided in the ABS, to provide the optimum brake force balance, regardless of vehicle loading, without the use of a load sensing mechanism. The system estimates vehicle and wheel deceleration, vehicle speed, and lateral acceleration as well as the rear wheel slip to dynamically control the rear brake force. By continually updating these control parameters, the system can further increase or decrease the rear brake pressure to maintain the optimum brake force balance throughout the braking maneuver.

18 Claims, 7 Drawing Sheets

DYNAMIC REAR PROPORTIONING BRAKE SYSTEM

TECHNICAL FIELD

This invention relates to vehicle brake pressure control systems and more particularly to such systems wherein the pressure to the rear brakes is dynamically controlled as a function of wheel braking characteristics to optimize vehicle brake performance.

BACKGROUND ART

In vehicle braking systems, it is often necessary to limit the hydraulic braking pressure available to the rear brakes. This is done to provide a balance between the front and rear brake forces to ensure adequate vehicle stability. The rear brake pressure proportioning is typically accomplished with a hydraulic valve which controls the rear brake pressure with a fixed proportionality to the front brake pressure. It has been proposed to use the Anti-lock Braking System (ABS) to perform the function of the rear proportioning valve and enhance the performance of the braking system. See British patent 1,431,466 assigned to the assignee of the present invention.

SUMMARY OF THE INVENTION

In accordance with the present invention a dynamic rear proportioning (DRP) system is provided that is integrated with an existing vehicle anti-lock braking system (ABS), utilizing the sensors and control devices necessary for those systems. The DRP system utilizes the anti-lock braking system to perform the function of the rear brake pressure proportioning. The rear brake hydraulic channel(s) can be isolated from the master cylinder by activating the rear isolation valves, provided in the ABS. DRP provides the optimum brake force balance, regardless of vehicle loading, without the use of a load sensing mechanism. The system monitors wheel speed and estimates vehicle and wheel deceleration, vehicle speed, and lateral acceleration as well as the rear wheel slip to dynamically control the rear brake force. By continually updating these control parameters, the system can further increase or decrease the rear brake pressure to maintain the optimum brake force balance throughout the braking maneuver. If the braking conditions change, the pressure can be increased incrementally by pulsing the isolation valve(s). As conditions permit, the pressure can be increased to a maximum pressure equal to that of the front channels (or master cylinder pressure). Since the only system activity is the shuttling of the solenoids, there is no perceptible change in the pedal feel and no discernable noise during DRP control. There are numerous benefits to such a system. The need for rear proportioning hydraulic components is eliminated, saving cost and weight. Brake force is more evenly distributed, optimizing vehicle stability, adhesion utilization, lining wear and temperature stress.

BRIEF DESCRIPTION OF THE DRAWINGS

A more complete understanding of the present invention may be had from the following detailed description which should be read in conjunction with the drawings in which, FIG. 1a depict the rear brake proportioning of a conventional braking system.

DETAILED DESCRIPTION OF PREFERRED EMBODIMENT

Figure 1A:
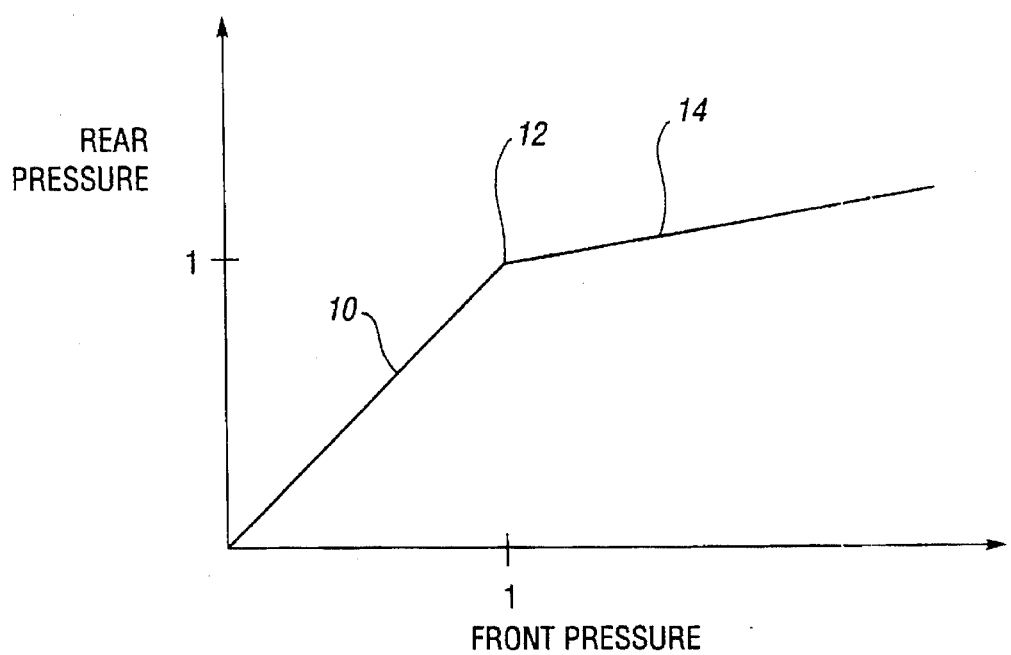
FIG. 1b depict the rear brake proportioning of the present invention.

Referring now to the drawings, and initially to FIG. 1a, the hydraulic proportioning of the rear brake pressure in a conventional brake system has a fixed profile as shown. The rear pressure tracks and is equal to that of the front pressure in the region 10 until the "knee" 12 is reached. At this point the increase in pressure to the rear brakes is limited by the hydraulic proportioning valve at a fixed ratio to the front (or master cylinder) brake pressure. The ratio, or slope of the curve in the region 14, is constant for the remaining pressure range and typically has a value in the range of 0.2 to 0.4. The knee and slope of the proportioning valve pressure profile is sized for the particular vehicle application.

Figure 1B:
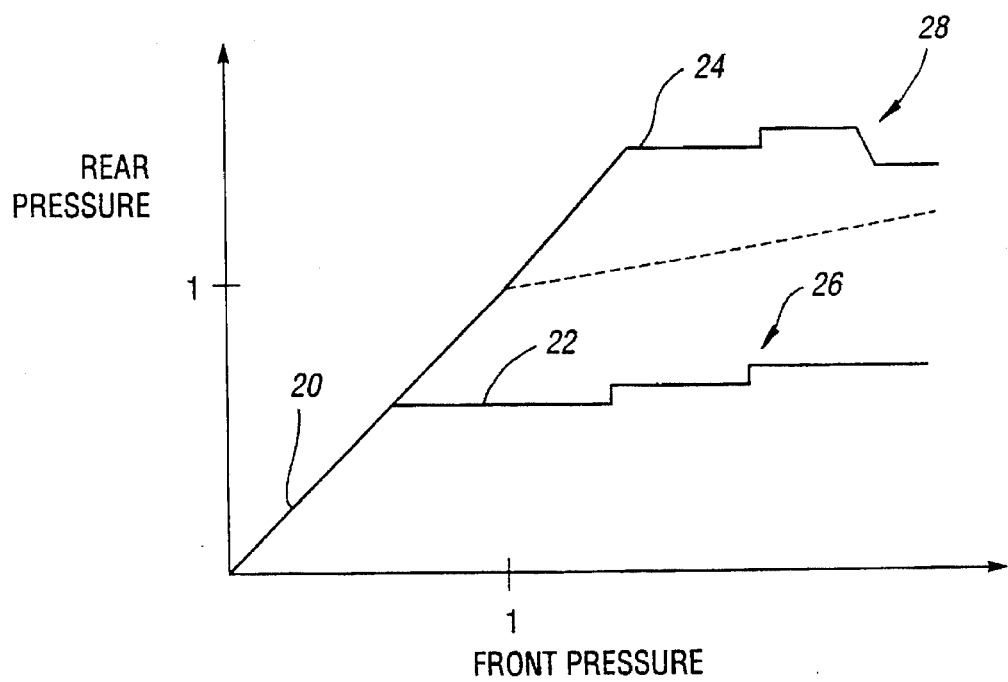

FIG. 1b shows the relationship between front and rear brake pressure when dynamic proportioning is used. A family of curves results, where the rear pressure is equal to that of the front in the region 20, until the rear slip and vehicle characteristics are such that the optimum braking efficiency has been reached for the given stopping conditions. At this point the rear brake pressure is maintained at a fixed level by activating the rear isolation valve(s) of the ABS hydraulic control unit. The rear pressure hold, as indicated at 22 and 24, is only maintained as long as the braking conditions remain within the performance window. The rear brake pressure can be increased and/or decreased as the conditions of the stop vary as indicated at 24 and 26. The bottom curve shows the rear pressure being held below the knee of the conventional proportioning valve and then increased over time. This would be indicative of hard braking during a turn where the rear pressure is kept low (due to the high lateral acceleration) to improve vehicle stability. As the vehicle slows, the rear pressure can be increased, since the lateral acceleration is decreasing. The dashed line represents the conventional system of FIG. 1a.

The top curve of FIG. 1b demonstrates how the rear brake pressure can increase well above that of the conventional system allowing for increased rear brake capacity. This can occur if the vehicle is heavily loaded and is stopping on a surface with good adhesion. The pressure is also shown to increase as well as decrease to optimize the braking performance. The pressure reduction 28 may be necessary to compensate for surface changes or steering maneuvers that occur while braking.

The DRP system will provide control of rear brake pressure for all braking conditions where ABS is not required. If during DRP activity, the front (or rear) channels require ABS activity, then DRP control is suspended and the rear channel(s) perform the required ABS control. During normal braking, the activation and de-activation of the DRP mechanism is dependent entirely on the conditions of the stop. DRP will only activate if required and can be preceded or superseded by ABS activity. If ABS activity is terminated before the vehicle has come to a complete stop, then DRP will assume control of the rear brake, by either maintaining the isolation of the rear brake pressure, re-applying pressure or de-isolating and terminating control. ABS activity is generally desirable upon detection of wheel instability or an incipient skid condition. What constitute wheel instability or an incipient skid condition may differ among different ABS implementations but, in general, exists if a predetermined wheel slip is achieved while wheel deceleration exceeds a predetermined limit. Wheel slip is calculated based on the difference between wheel speed and a calculated wheel speed reference.

Figure 2:
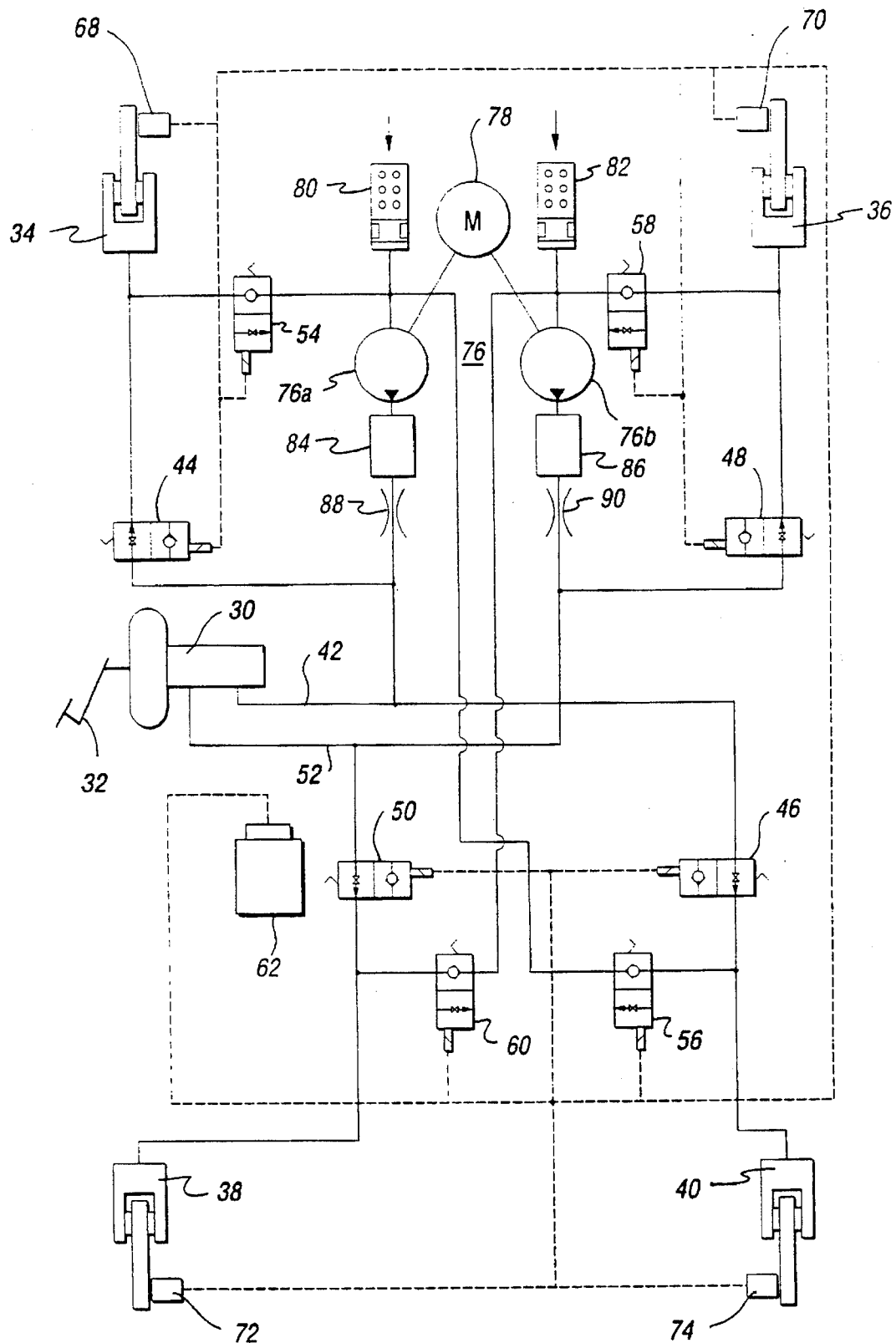
FIG. 2 is a generalized schematic diagram of the hydraulic and electrical components of an integrated dynamic rear proportioning and anti-lock braking system of the present invention.

A generalized schematic diagram of the hydraulic and electrical components of an integrated dynamic rear proportioning and anti-lock braking system is shown in FIG. 2. The hydraulic system includes the usual master cylinder/booster generally designated 30. The master cylinder 30 may be operated by the vehicle driver through a brake pedal 32, for applying fluid pressure, with power assist, to left and right front and rear wheel brakes 34, 36, 38, and 40 respectively. Fluid pressure is applied to the brakes 34 and 40 via fluid line 42 under control of solenoid operated apply valves 44 and 46 respectively. Similarly, fluid pressure is applied to the brakes 36 and 38 under control of solenoid operated apply valves 48 and 50 respectively via the fluid line 52. Solenoid operated dump valves 54 and 56 are included in the fluid line 42 for reducing the fluid pressure to the brakes 34 and 40 respectively. Similarly, fluid pressure to the brakes 36 and 38 may be reduced by actuating solenoid operated dump valves 58 and 60 included with the fluid line 52.

The apply valves 44–50 and the dump valves 54–60 are controlled by output signals from a microprocessor based electronic control unit (ECU) 62 which receives input data from speed sensors 68–74. A brake lamp switch, not shown, is operated by the brake pedal 32 and provides an input to the ECU 62. The sensors 68–74 are responsive to the speed of left front (LF), right front (RF), left rear (LR), and right rear (RR) wheels of the vehicle respectively. During normal braking, the apply valves are open permitting fluid pressure to be applied by way of the master cylinder 30 to the front and rear brakes, as long as the normally closed dump valves remain closed thereby preventing fluid flow from the brakes. Whenever ABS operation is dictated by the ECU, the normally open apply valves will energize isolating the wheel brakes from the master cylinder. The normally closed dump valves are opened by energization of the associated solenoid to relieve pressure at a wheel brake. During ABS operation the apply valves may be opened by deenergization of the associated solenoid to build the pressure to the brake as long as the associated dump valve is closed.

Pump 76 is preferably a reciprocating dual piston-type pump driven by a motor 78. The motor 78 is energized from the ECU 62 whenever ABS operation is dictated by the ECU. The individual pistons of the pump 76 are represented at 76a and 76b. The pump is connected on its suction side to accumulators 80, 82 and on its pressure side to damping chambers 84 and 86 each having a restriction orifice 88 and 90.

Figure 3:
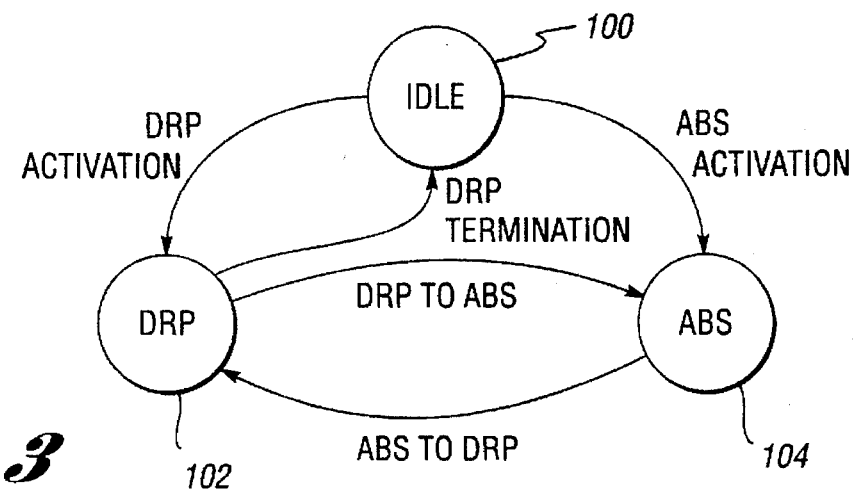
FIG. 3 is a state transition diagram of the DRP of the present invention.

When dealing with the transitions between the DRP and ABS modes, there are three control states as shown in FIG. 3. The states are; 1) IDLE (no activity) indicated at 100, 2) DRP control indicated at 102, and 3) ABS control indicated at 104. The rear channels cannot transition from the ABS state to the IDLE state without first transitioning back into DRP control.

In the IDLE mode the controller is actively processing information and performing calculations, but no control actions are being performed. In the ABS mode, there is at least one channel or wheel where brake pressure is being automatically controlled by the ABS controller. The ABS mode is characterized by continually forcing wheel instability in a cyclic manner to minimize stopping distance and maximize vehicle stability. In the DRP mode of operation the electronic controller automatically controls the pressure at the rear brakes. The system tries to maintain the optimum brake balance without activating ABS control. The DRP control system can hold, apply and dump pressure, but the design goal is to primarily hold the rear brake pressure at the optimum level. In this way, the DRP control will be no more noticeable to the driver than the mechanical system it is replacing. If too much control activity occurs, excessive pulsing of the pressure can be felt in the brake pedal and may even require the operation of the pump which is to be avoided in the interest of driver satisfaction.

As indicated in FIG. 3 there are a number of mode transitions possible. During vehicle deceleration the control parameters are monitored and if conditions warrant, the controller can transition from the IDLE mode to the DRP mode. A transition from the IDLE mode to the ABS mode is typically caused by an aggressive or panic brake application. The brake pressure quickly exceeds the peak allowable for the surface and the wheels are progressing towards a locked condition. A transition from the DRP mode to the ABS mode occurs if at least one rear wheel has become unstable as indicated by excessive slip and wheel deceleration. This "rear only" ABS may be very short in duration i.e. only one controller cycle in some cases. ABS control is also activated on the rear wheels if both front wheels have transitioned into ABS control, regardless of the rear slip and deceleration levels. In the simplest case of rear only ABS, an ABS to DRP mode transition will occur after the wheel returns to a stable condition. An example of this would be that during DRP control some condition changed which caused one (or both) rear wheels to become unstable and thus activated the ABS mode of control. After the wheel recovery, if no addition (or other) wheel instability occurs, then the system transitions back to the DRP mode of control. In all cases the system must transition into the DRP mode of control from ABS. This is necessary because a transition from the ABS mode to the IDLE mode on the rear channels may induce a skid condition since the master cylinder pressure may be high enough to force a rear wheel lock, but not a front wheel lock. For example, assume the system is active in ABS on both front and rear channels with a master cylinder pressure of 1,000 psi. The master cylinder pressure is then reduced (by the driver) to 700 psi. Assume that at this pressure and surface condition, front ABS is not required and is terminated such that the front brakes also have 700 psi (equal to the master cylinder). It is possible that 700 psi would force wheel lock on the rear brakes and cause ABS to reactivate if the rear channels are allowed to transition from the ABS mode to the IDLE mode. What is actually desired is that ABS be allowed to terminate on the rear channels, but the electronic rear pressure proportioning control be maintained. Accordingly, the system transitions from ABS into DRP control so that the controller can monitor vehicle conditions and continue to perform the rear pressure proportioning function. If conditions are such that rear brake proportioning is no longer required, then the DRP to IDLE transition occurs. A transition from the DRP mode to the IDLE mode occurs if the conditions no longer warrant the automatic control of the rear brake pressure for front to rear proportioning. This can be either due to low speed (vehicle stopped) or by a reduction of brake pressure (brake pedal release).

The DRP control mechanism can be considered a subsystem of the ABS controller. Both shared information and information calculated specifically for the DRP function is used for control of the rear brakes. The DRP control mechanism is partitioned into two sections. The main section facilitates the state control functions, arbitrating between system activation and de-activation, pulse-up modes, hold modes, the dump mode and the transition from DRP control into full ABS control. The second section deals with evaluating the dynamics of the braking maneuver and determining the need for DRP control. This latter section will be referred to as the DRP activation threshold management.

Figure 4:
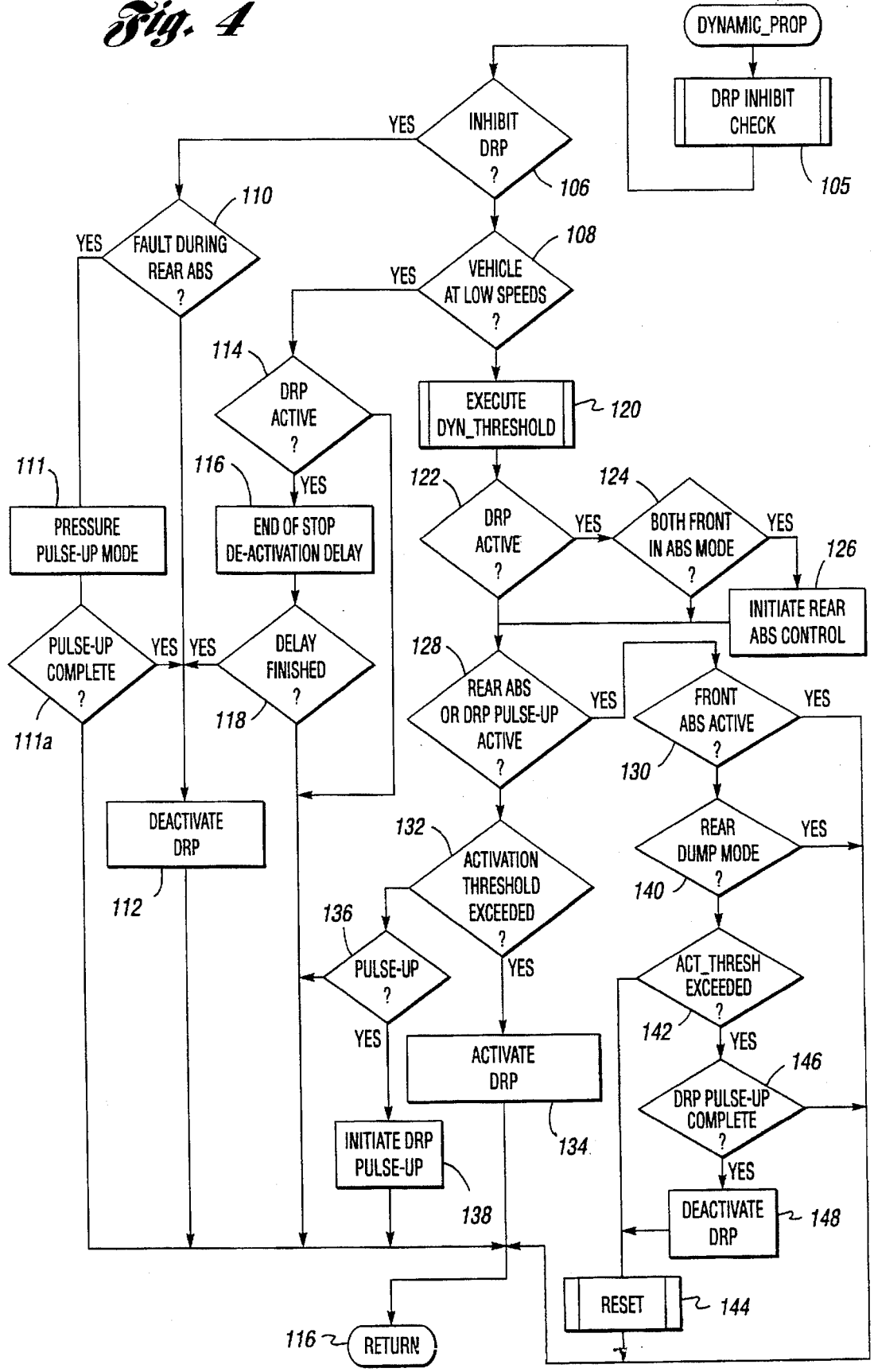
FIG. 4 is a flowchart of the DRP controller of the present invention.

Referring now to FIG. 4, a flowchart of the DRP control scheme is shown. At block 105, a subroutine is called to determine the DRP failsafe status. At block 106 a check is made of the DRP failsafe status. The failsafe system will be discussed in greater detail hereinafter. It is sufficient at this point to say that a decision is made as to whether there is sufficient system functionality for the DRP control to activate or remain active. If so, then the control is passed on to block 108. If the DRP system must be inhibited, then blocks 110 and 112 are executed in which all DRP control is terminated and/or inhibited. In block 110, a check is made of the fault status to determine if a system fault occurred during ABS activity. If a fault occurs during ABS activity such that the system must be shutdown, a controlled shutdown is executed on the rear brakes. This is done to maintain as high a level of vehicle stability as possible during the fault shutdown. In particular, instead of de-isolating the rear brakes, a controlled pressure apply sequence is executed to gradually return the rear brakes to master cylinder pressure. During this condition, the DRP inhibit is bypassed as indicated by the YES path from block 110 and block 111 is executed which performs a DRP-type pulse-up. This is consistent with the state transition illustrated in FIG. 3 in which a transition from ABS to IDLE is not permitted, but requires that first a transition to the DRP mode occur, even for a fault condition during ABS control. The execution of block 112 will terminate the control once the pulse-up is completed, as determined by block 111a. The DRP deactivation function shown in block 112 is also used in the termination of normal DRP activity as described hereinafter.

After the failsafe check at block 106, a check of estimated vehicle speed, is made at block 108. If the vehicle speed is below a fixed threshold or low speed limit, then entry into the DRP mode is inhibited if the DRP mode is not already active. If DRP was active when the low speed limit was reached then the DRP mode proceeds through a shutdown process. In block 114 a check is made to determine the status of the DRP function when the predetermined low speed limit is reached. If DRP is not active then no action is necessary and the system returns to the main loop as shown at block 116. If DRP is active when the low speed limit is reached, then an "end-of-stop" shutdown procedure is executed as indicated at block 117. In this process, a delay is imposed which keeps the DRP system active even though the vehicle has reached the low speed limit and may possibly have already come to a full stop. This delay is realized through the decision block 118. During DRP control, the rear channels are isolated from the master cylinder and therefore can be at a much lower pressure relative to the master cylinder pressure. If the rear channels are de-isolated by the termination of DRP immediately after the vehicle has reached the low speed limit, then there will be a sudden drop of the brake pedal. This pedal drop is caused by the equalization of brake pressure between the rear channels and the master cylinder. By imposing a delay, typically on the order of 1 second, there is typically enough time for the vehicle to come to a complete stop and for the driver to relax pressure on the brake pedal. In this case, the de-isolation of the rear channel will not be as noticeable to the driver, since the master cylinder pressure will typically have been reduced by this time and more closely match that of the rear brakes. Until the delay is complete, flow return to the main loop from block 116. When the delay is complete, then flow passes to block 112 to terminate the DRP control.

If the vehicle speed has not reach the low speed limit, then block 120 is executed which calls the DRP activation threshold calculation subroutine. This subroutine is described hereinafter with reference to FIGS. 5a and 5b. The output, or value returned, is the DRP activation threshold. The threshold is a value between zero and a maximum upper limit, where a value of zero is used to indicate the need for DRP control. After the activation threshold calculation is complete, the DRP to ABS transition control is performed. This is initiated by a check of the status of the DRP activity, as indicated by block 122. If DRP is active, that is to say the rear wheels are either in a hold, dump or apply phase, a determination is made as to whether there is any ABS activity on the front channels. The activation criterion for rear ABS requires both front channels to have dumped pressure before DRP control is relinquished allowing a transition into ABS. The evaluation of front ABS activity is indicated at block 124. By requiring that both, rather than just one channel has dumped pressure, an undesired transition to full ABS control is avoided. If both front wheels are in ABS mode, block 126 is executed which sets and clears the appropriate control flags for rear ABS to occur. When the rear channels transition into ABS control, an apply sequence is initiated to force a rear departure. The apply sequence will mark the start of rear ABS control unless a rear wheel departure occurs before the front channels enter the ABS mode. In this case, the rear ABS will start with a rear dump sequence. If, after the rear dump sequence is complete, the front channels are detected in block 124 to be in the ABS mode, then normal ABS control is used on the rear wheels. If on the other hand, the front channels are not in the ABS mode, then the rear channels remain under DRP control after the rear dump sequence.

Decision block 128, differentiates between the activation and hold modes of DRP control and the pulse-up or ABS control modes. In block 128 a rear CYCLE flag is checked. This flag is true if the rear channels are either under ABS control or a DRP pulse-up mode has been initiated or is in progress. If the flag is true, flow passes to decision block 130. If DRP is not active, or if DRP is active but in a hold mode, then the CYCLE flag will be false and flow passes to decision block 132 which checks the value of the DRP activation threshold which was calculated by the subroutine called from block 120. If the threshold is zero (it is limited to zero when it becomes negative), then the DRP mechanism is activated at block 134. If the DRP system is already active, then it remains so, which constitutes the DRP hold mode. The activation and pressure hold is shown as the YES path out of block 132, and the execution of block 134. In block 134, the necessary control flags are either set or maintained.

If the activation threshold is greater than zero, then either DRP control is not required or the braking conditions have changed such that more rear brake torque can be applied. The DRP pulse-up determination is made at block 136. If the system is not under DRP control, then a threshold value greater than zero indicates that DRP control is not required and the NO path is taken out of block 136. For this condition the system returns to the main control loop via block 116. If the system is currently under DRP control then two control steps are taken within block 136 to determine if a pulse-up mode should be initiated. The first compares the actual value of the DRP activation threshold to a fixed parameter. As the conditions for DRP control start to dissipate, the activation threshold will start to increase. The increase is proportionate to the change in conditions. For example, as the vehicle deceleration decreases, the activation threshold will increase indicating less of a need for DRP control. If this condition is met, then a counter is incremented which acts as a hysteresis for the activation of the pulse-up mode. After being incremented, the counter is compared to a hysteresis threshold value. The counter must exceed the threshold before the pulse-up is initiated. The combination of these two checks act to prevent momentary changes in the braking conditions from activating the DRP pulse-up mode. If the above conditions are met, then block 138 is executed. In block 138, the rear CYCLE flag is set as well as a DRP pulse-up control flag, which will initiate the pulse-up mode on the subsequent control loop. In addition to these flags, a DRP termination counter threshold is established. This is done to establish. a pulse-up time and to prevent the DRP pulse-up from continuing for an indefinite amount of time.

For straight line stopping conditions, the pulse-up duration counter is typically set near the pulse-up time out. Thus, the pulse-up mode will be of relatively short duration for straight line stopping conditions. The main reason for this is that if the brake pedal is pumped at the correct frequency and the DRP mechanism is activated (without ABS) at each pedal apply, the pedal can feel "hard." This would be caused if a long pulse-up was used as the rear channels would stay in the DRP pulse-up control during the pedal pump. Note that the brake switch cannot be used to eliminated this problem as it may not toggle during the pedal pumping. To eliminate this problem, the DRP to IDLE state transition logic allows a quick time-out by initializing the pulse-up counter near to the pulse-up time out threshold. There are a number of exceptions to this where a much larger pulse-up sequence is used. For example, if the vehicle is in a turn and the pulse-up is initiated. The determination of a vehicle turn is made with an estimation of the vehicle lateral acceleration. This variable will be described in more detail in the DRP activation threshold discussion in connection with FIGS. 5a and 5b. If the lateral acceleration exceeds a nominal threshold, then the counter is initialized to zero in block 136, enabling a full pulse-up sequence. This is done to ensure good vehicle stability throughout the turning maneuver. The execution of the pulse-up mode will be described in more detail hereinafter.

Returning now to block 128, if the system is in an ABS or DRP pulse-up mode a determination is made in block 130 as to whether either front channel is currently in an ABS control mode. If so, then the system returns to the main control loop allowing for continued ABS control. If there is no front ABS activity, then a rear dump mode check is made, at block 140, to determine if the rear channels are in a ABS mode. If either the rear channel is executing a DRP dump pulse or ABS control is in the early stages of activation and is being initiated with rear wheel instability, the system returns to the main loop via the YES path of block 140 to allow the rear dump (and possibly ABS) control to continue.

If the rear dump mode is not active, then another mode transition decision is made. Once again the level of the DRP activation threshold is checked at block 142. If the threshold is equal to zero, then the system will transition into the DRP hold mode through the NO path of block 142. This can occur either in the case of an ABS to DRP transition or from the need to terminate the DRP pulse up mode. In the case of the transition of ABS to DRP, the front channels will have already terminated (as indicated by the check in block 130) and the rear channels will be in a pressure apply mode (as indicated by the NO path out of block 140). As the pressure is being applied to the rear brakes, the DRP activation threshold will be approaching zero due to the increase in brake torque. It is when the threshold reaches zero that the transition from the rear ABS mode to the DRP hold mode occurs. In a similar fashion, the DRP pulse up mode is terminated by the activation threshold being reduced to zero. As the pressure apply continues, the rear brake torque and wheel slip increases. This, in turn, will cause the activation threshold to decrease, eventually reaching zero and terminating the pulse up mode. The decisions made in blocks 128, 130, 140, and 142 are all required to qualify the occurrence of the mode transitions. The mode transition is realized through the cleaning of the CYCLE flag by the RESET block 144. Note that when the rear CYCLE flag is cleared, this results in the NO path being taken out of block 128 on the subsequent control loop. As described earlier, this path will result in a DRP hold mode until the activation threshold increases far enough to (re)engage the pulse-up mode.

Returning now to block 142, if the activation threshold is greater than zero, then a check is made of the DRP pulse-up control as shown by block 146. A pulse-up duration counter is incremented and checked in this logic. If the time out threshold is not exceeded, then the system returns to the executive control loop. This logic path is also taken during the pressure re-apply phase after a DRP dump pulse. In this case, pressure is partially restored to the wheel, after wheel recovery, utilizing the ABS apply mode until the DRP activation threshold reaches zero. This is facilitated with the DRP pulse-up control flag which will be false under these conditions. If the YES path is taken out of block 146, the pulse-up duration counter has been exceeded. At this point the DRP control flag is cleared and the reset function is called as shown in blocks 148 and 144. If the DRP control flag is clear when the reset is performed, then a complete reset occurs and DRP control is terminated.

DRP Activation Threshold Management

As previously described, the DRP activation threshold is generated by assigning a value to a variable and decaying or reducing it with various vehicle parameters. When a value of zero is reached, DRP will activate. This method was selected for convenience if implementation in the microprocessor and several alternate control means could have been selected which would achieve the same result. The routine takes the estimated vehicle parameters of lateral acceleration, longitudinal deceleration, velocity and the relative rear wheel slip and reduces the activation threshold with a weighted contribution from each. The parameters are weighted and limited to scale the influence of each control parameter on the activation.

Figure 5A:
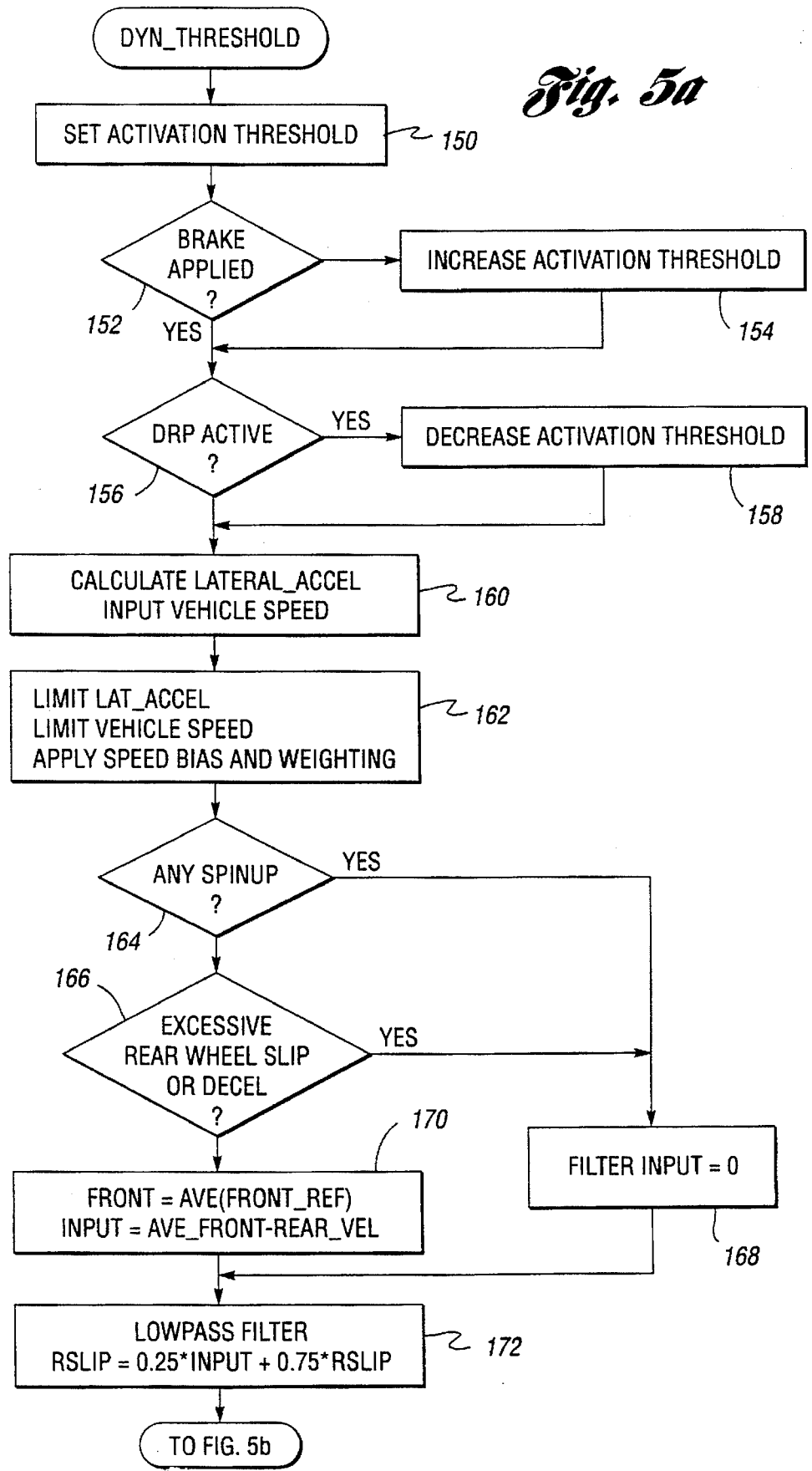
FIGS. 5a and 5b are a flowchart of the activation threshold calculation performed by the DRP controller of the present invention.
Figure 5B:
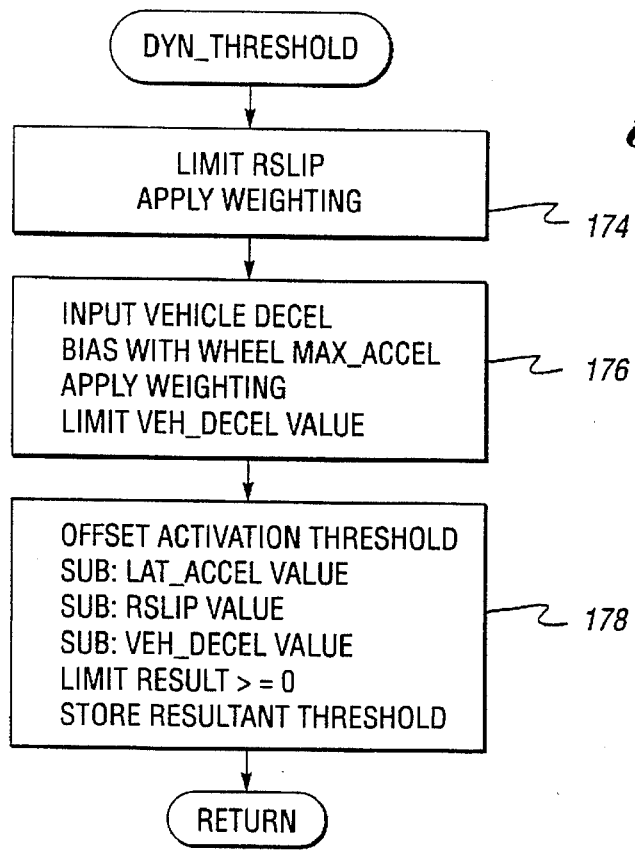

FIGS. 5a and 5b are flowcharts of the DRP activation threshold calculation. In block 150, the activation threshold is loaded with the default value. The magnitude of this value will determine the base DRP activation sensitivity. The value selected will also be influenced by the scaling and weighting factors used in the reduction process. At block 152 the status of the brake switch is checked. If the brake is applied, then there is no change to the threshold at this point. If the brake is not applied, then block 154 is executed which adds a fixed offset to the activation threshold. This is done primarily to de-sensitize the system and prevent false or early activation when the brake is not applied. It is possible to get significant values of lateral acceleration, vehicle deceleration and some rear wheel slip even if the brake is not applied. At the same time, the system must still function even with a failure of the brake switch. By adding an offset to the threshold, the system will still activate in the event of a failed brake switch but it will be less likely to falsely activate from variations in the control parameters.

In block 156 a check of DRP status is made in order to latch the DRP mode once it is activated to provide hysteresis. A check is made of the DRP control flag and if DRP is active then block 158 is executed which reduces the activation threshold by a fixed amount. This is mainly done to prevent the system from transitioning into and out of DRP control when the threshold is hovering around the zero or activation point. By subtracting a fixed value when DRP is activated, the threshold is made negative and saturated at zero. Then a level change in the control parameters which is equivalent to the offset applied in block 158 must occur before DRP will be de-activated.

The next two blocks, 160 and 162, input, limit and weight the lateral acceleration signal. This signal is an estimated value based on the difference in the un-driven wheel speeds. It could also be supplied by a sensor and then used in a similar manner by the threshold calculation routine. The details of the calculation of the lateral acceleration signal will not be described, but are available in the patent application KELS 0256 PUS, Method And System For Turn Detection, filed Jul. 21, 1995, assigned to the assignee of the present invention and which is incorporated herein by reference. The weighting of the signal is used to establish the level of reduction of the activation threshold that will occur for a given increase in the lateral acceleration. For example, an increase in lateral acceleration of 0.5 g could be weighted to provide a 50% reduction in the activation threshold. Therefore, additional reduction of the threshold will have to occur from the other control parameters before DRP will activate. The limit function, which will be described in more detail hereinafter, is used to set the minimum and maximum contributions of the various control parameters to the reduction of the activation threshold. For example if a minimum of 0.1 g is used for the lateral acceleration signal, then any signal level below this value will have no effect on the activation threshold. Similarly, if the lateral acceleration exceeds the maximum value, 2.0 g for example, then there will be no additional reduction to the activation threshold for any values above this limit. After the processing of the lateral acceleration signal, it is stored in temporary memory for the final computation later in the routine.

The blocks 164 through 174 are then executed to calculate the relative rear wheel slip. This signal is not wheel specific, but rather an average rear axle slip value. It is determined by comparing the average rear wheel speed to the average of the front wheel speeds and then filtering the resultant signal. This is not an absolute slip value, but a difference between the front and rear average slip levels, and therefore the amount by which the rear axle slip exceeds that of the front. As such, there are conditions under which this calculation becomes invalid and must be circumvented. The first such condition is given in block 164, where if a driven wheel is in a spin-up condition, then the YES path is taken. A spin-up condition is defined by a wheel that is accelerating and the wheel speed exceeds a reference by a pre-determined amount. This condition usually occurs from hard acceleration on a slippery surface or when a wheel is recovering from an ABS departure. If the spin-up condition is not indicated, then block 166 is executed which looks at the rear wheels slip and deceleration. If either of these values exceed a predetermined threshold (typically wheel slip in excess of 6.25% of vehicle speed or wheel deceleration in excess of 1.0 g), then the wheel is becoming unstable and the YES path is taken. If the YES path is taken out of either block 164 or 166, block 168 is executed where a slip filter input of zero is used in place of the difference between the front and rear slip. A zero input to the filter will cause the rear slip signal to decay at a rate equal to that of the filter time constant. During times of rear wheel instability, the slip signal is no longer valid and thus is forced to decay to zero. The slip calculation will resume, as shown in block 170 as long as the conditions of blocks 164 and 166 are false. The average of the front wheel speeds is calculated from the two front wheel speed references. The front references are equal to the filtered wheel speeds as long as the front wheel acceleration or deceleration is within predetermined limits. The filter input, or instantaneous rear slip, is then calculated by subtracting the average rear wheel speed from the average front wheel speed. Block 172 is then executed which shows the low pass filter used to calculate the final rear slip value. A 25% new and 75% old filtering is used. Next, in block 174, the limit and weighting of the signal is applied as in the case of the lateral acceleration signal. Once again this final value is stored in temporary memory for a later calculation.

In block 176 the vehicle deceleration signal is input and processed. As with the lateral acceleration signal, the vehicle deceleration estimate is calculated as part of the ABS algorithm. The signal is essentially calculated by averaging the wheel speed references to get an estimate of the vehicle speed and then differentiating that signal to get deceleration. The deceleration signal is then further processed by biasing it with the average of the wheel peak acceleration signals.

Figure 6:
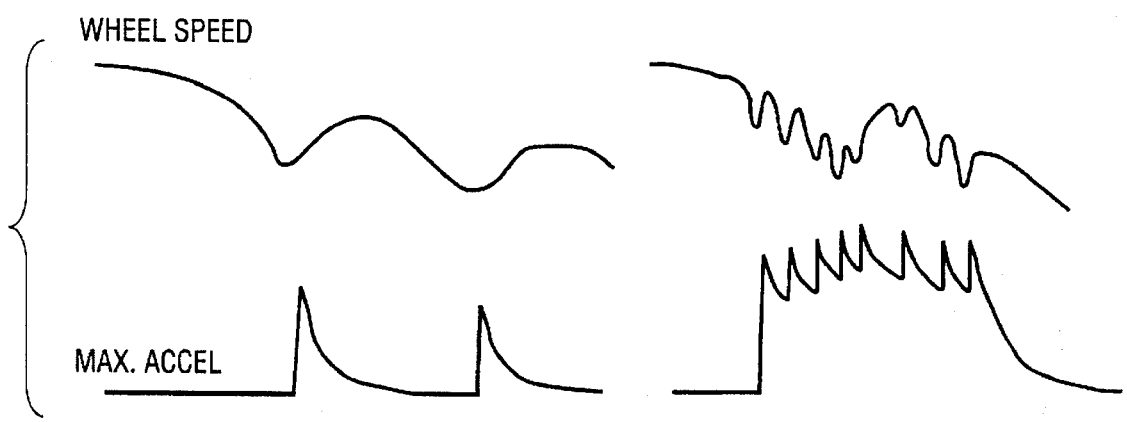
FIG. 6 demonstrates the effect of the wheel speed maximum acceleration capture and filter mechanism of FIGS. 5a and 5b.

FIG. 6 demonstrates how the wheel speed maximum acceleration (MAX_ACCEL) capture and filter mechanism works. When the wheel is recovering from an oscillation (or departure), the maximum acceleration is stored in the MAX_ACCEL variable. As long as the wheel acceleration is less than the stored value, then the stored value will be decayed with a fixed filter. A typical decay value would be $15/16$ i.e. the value will be decayed by $1/16^{th}$ of its previous value each iteration of the control processor. It is apparent in FIG. 6 that if the wheel continues to oscillate, the MAX_ACCEL parameter will not have a chance to decay significantly before another acceleration occurs and loads MAX_ACCEL with a larger value.

Once biased with the average of the MAX_ACCEL signals as shown in block 176, the vehicle deceleration is weighted and limited and then, as with the other control parameters, stored in temporary memory.

The final calculation shown in block 178 takes the activation threshold and modifies it by subtracting the lateral acceleration, rear slip and vehicle deceleration control parameters. The result is then stored and returned for use in the main DRP control loop. If the various control parameters have enough magnitude to reduce the activation threshold to zero or less, then a value of zero is returned and DRP will activate.

Figure 7:
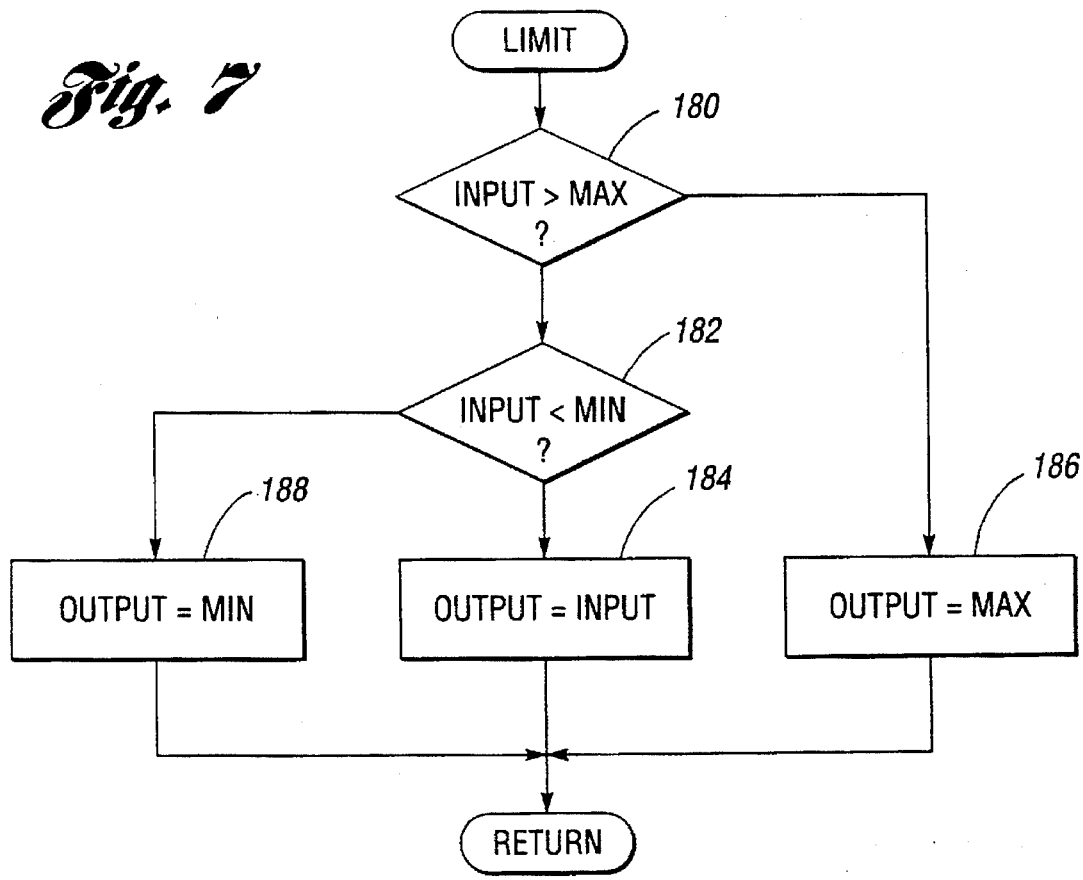
FIG. 7 is a flowchart of the limit function in FIGS. 5a and 5b.

The limit function performed in blocks 162, and 174–178, is shown in blocks 180 through 188 of FIG. 7. In blocks 180 and 182, the input parameter is compared to the maximum and minimum values. If the input is within these values, then it drops through and the output is set to the input value as shown in block 184. If the input is greater than the maximum then the output is set equal to the maximum value as shown in block 186. If the input is less than the minimum, then the output is set equal to the minimum value as shown in block 188. In all of these cases the output value is returned to the threshold calculation routine through the return block. The activation threshold calculation carried out in blocks 150–186 may be expressed in equation form as:

$$T = K_0 + K_{BRAKE} - K_{DRPACT} -$$
$$W1*LAT\_ACCEL*AVEL/MAX\_AVEL -$$
$$W2*RSLIP - W3*(VEH\_DEC - K_{MACEL}*\Sigma MACEL)$$

where;

T=the resultant value or threshold used for DRP activation;

$K_0$=a default or nominal offset value;

$K_{BRAKE}$=a constant added when the brake switch is open;

$K_{DRPACT}$=a constant value subtracted when DRP is active;

W1=a weighting factor used on the contribution of lateral acceleration;

LAT_ACCEL=estimated vehicle lateral acceleration;

AVEL=estimated vehicle speed used to influence the effect of LAT_ACCEL;

MAX_AVEL=maximum estimated vehicle speed at which LAT_ACCEL effect is increased. Above this speed the effect of LAT_ACCEL is reduced.

W2=weighting factor used on the contribution of the rear slip variable;

RSLIP=estimated and filtered rear slip value;

W3=weighting factor used on the contribution of the vehicle deceleration;

VEH_DEC=estimated vehicle deceleration;

$K_{MACEL}$=scale factor and gain used on the MACEL variable contribution;

$\Sigma MACEL$=sum of the wheel maximum acceleration values.

The activation threshold equation is executed every loop of the processor and thus can be considered a "real time" calculation. It always has a value of $K_0$ which, when reduced to zero, will result in the activation of DRP. The values of $K_{BRAKE}$ and $K_{DRPACT}$ are used conditionally, based on decision logic in the routine. All other terms are actively effecting the value of the threshold.

Failsafe and Diagnostics

The failsafe and diagnostic functions of the DRP system are founded in those of the ABS system, but go beyond the normal failsafe procedures used for an ABS fault. In particular, there are several fault conditions in which the ABS system will be disabled, but the DRP control mechanism will still function normally. In the event that one such fault is detected, the system will remain operational in a DRP Keep-Alive mode. The ABS warning lamp will still be illuminated indicating that a fault exists in the ABS system, but the DRP mechanism will still function.

The DRP mechanism will continue to function normally during an ABS fault condition, as long as the system fault permits normal functioning. The DRP system requires the Rear Isolation valves and cannot function if there is a fault detected in either rear isolation coil. Fault detection is also performed on the solenoid drivers and DRP cannot function if any shorted solenoid driver is detected. In this case, the power relay must be de-activated to prevent any further damage to electronic components. In the case of a Low Power condition, the voltage must be high enough for the microprocessor and coil driver electronics to operate for DRP to continue to function. A special fault buffer is used to control the enabling of the DRP Keep-Alive mode. This fault buffer is used to ensure that only the DRP critical faults disable DRP entirely. The fault buffer is also used to keep track of current faults for each power-up cycle. Therefore, if DRP is inhibited due to multiple faults, but then on a subsequent power-up cycle a fault is cleared, then DRP Keep-Alive will be re-enabled as long as the remaining fault(s) allow for DRP control. In this fashion, we are able to keep the DRP system operational even though a fault has occurred which has disabled the ABS system from functioning.

Figure 4A:
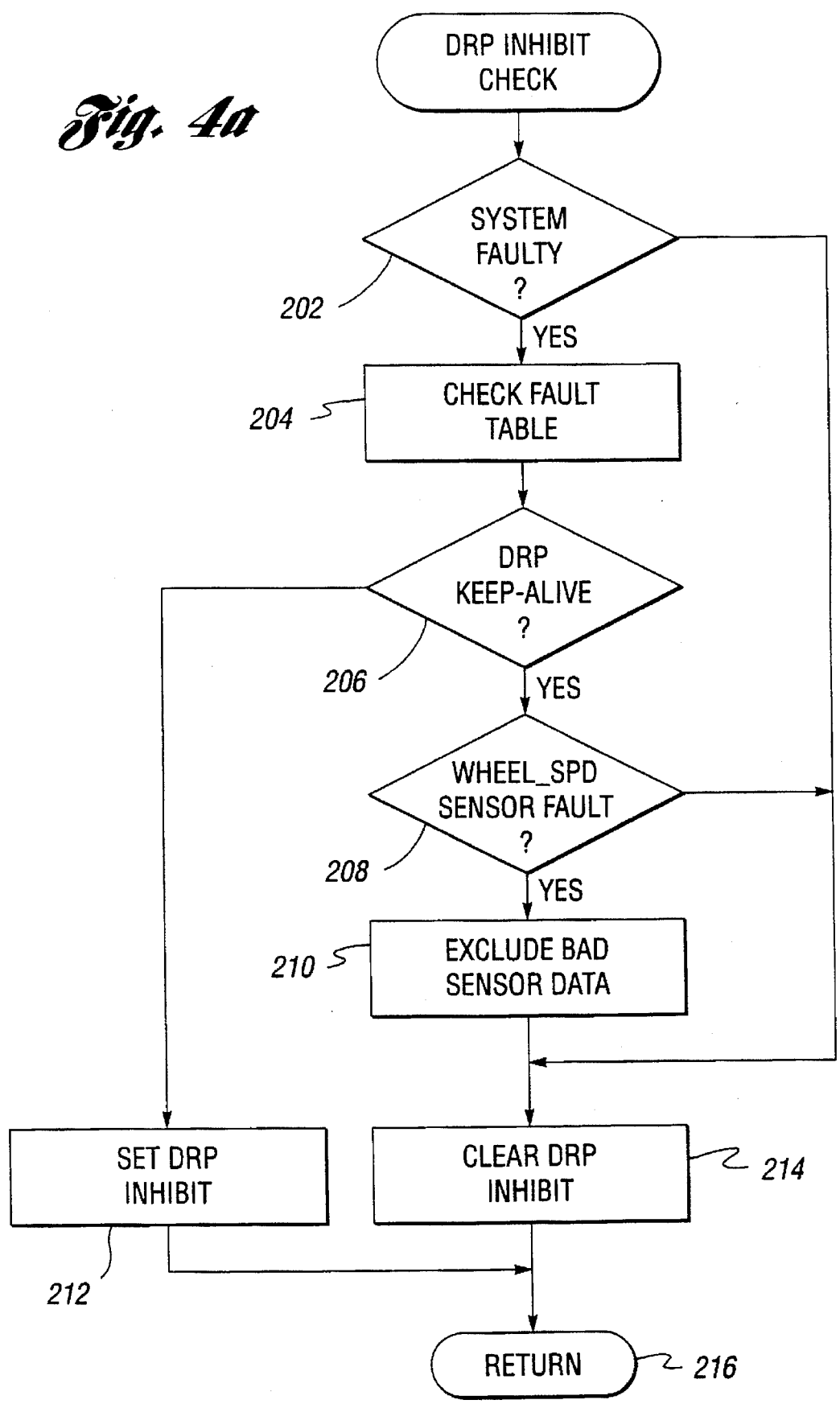
FIG. 4a is a flowchart of the DRP inhibit check routine.

Returning now to FIG. 4 and as indicated earlier, the dynamic proportioning routine starts with a subroutine call to the DRP INHIBIT CHECK routine at block 105. This routine is used to determine if there is a system fault and, if so, whether the DRP Keep-Alive can function. Referring now to FIG. 4a, a flow chart of the decision logic for DRP Keep-Alive is shown. In block 202, a check is made in memory to determine if a system fault has occurred. If there is no fault code in memory, then the no path is taken where the DRP inhibit flag is cleared at block 214 and at block 216 a return is made to the DRP control loop.

If a system fault is detected, then the YES path is taken and block 204 is performed. In this process, a table look-up is performed to determine if the system fault is one in which the DRP system can remain functional. The following table is a list of ABS system faults in which the DRP function will remain active and the faults in which the DRP will be disabled. Note that the ABS also stays active for the brake switch related faults. These faults are detected and recorded for information and service purposes only.

The following table is a list of ABS faults in which the DRP function will remain active and the faults in which the DRP will be disabled.

| FAULT CONDITION | | DRP ACTIVE | NO DRP |
|---|---|---|---|
| OPEN RELAY CONTACTS | | | X |
| SHORTED RELAY CONTACTS | | | X |
| OPEN PUMP MOTOR | | X | |
| SHORTED MOTOR OR LOCKED MOTOR | | X | |
| OPEN ISOLATION COIL OR SHORTED DRIVER | | | X |
| SHORTED ISOLATION COIL OR OPEN DRIVER | | X | |
| OPEN DUMP COIL OR SHORTED DRIVER | | | X |
| SHORTED DUMP COIL OR OPEN DRIVER | | X | |
| EXCESSIVE DUMP TIME | | X | |
| OPEN SENSOR | SINGLE | X | |
| | MULTIPLE | | X |
| MISSING SENSOR | SINGLE | X | |
| | MULTIPLE | | X |

-continued

| FAULT CONDITION | | DRP ACTIVE | NO DRP |
|---|---|---|---|
| SENSOR DROP OUT | SINGLE | X | |
| | MULTIPLE | | X |
| WHEEL SPEED ERROR | | | X |
| ROM ERROR | | | X |
| RAM ERROR | | | X |
| MISMATCHED CALCULATION RESULTS | | | X |
| HANG-UP OF PRIMARY CPU | | | X |
| HANG-UP OF SECOND/BOTH CPU(s) | | | X |
| MISMATCHED CONTROL LOOP TIMES | | | X |
| INOPERATIVE WATCHDOG CIRCUIT | | | X |
| SHORTED ABS LAMP | | X | |
| GROUNDED ABS LAMP | | X | |
| LOW INPUT VOLTAGE | | X | |
| HIGH INPUT VOLTAGE | | X | |
| INTERRUPTED BRAKE SWITCH | | X | |
| STUCK BRAKE SWITCH | | X | |
| INOPERATIVE BRAKE SWITCH | | X | |

In block 206, a check is made on the output of the fault table to determine if the DRP Keep-Alive mode should be initiated. If the YES path is taken, then DRP can operate even with the presence of the system fault. A further check is made on the type of system fault at block 208 to determine if the fault is related to a wheel speed sensor. If it is not, then control jumps to block 214 where the DRP inhibit is cleared and control is returned to the main DRP control via block 216. If the fault pertains to a wheel speed sensor, then the YES path is taken from block 208 and the logic of block 210 is performed. The logic prevents the data from the faulty sensor from being used in the various control mechanisms which input the wheel speeds.

In some cases where a wheel speed sensor fault has been detected, there may be a small degradation in the system performance since the failed wheel speed sensor information is no longer reliable and cannot be used. If a single sensor fault occurs, the DRP system will remain operational and may experience a small reduction in performance. The reduced performance will result from the loss of information that may have contributed to the control mechanism. For example, if a rear sensor fault occurs and the vehicle is being braked on a split mu surface, it is possible to cause excessive slip to the faulty rear channel. If the fault occurs to the low mu rear wheel, then the DRP system must control both rear channels based on the high mu rear wheel speed sensor. The DRP system cannot function with multiple sensor faults.

After the faulty wheel speed information is excluded, then the DRP inhibit is cleared in block 214 allowing DRP system to continue operation and control is returned to the main DRP control via block 216. Returning to block 206, if the fault is one in which the DRP system cannot function, then block 212 is executed in which the DRP inhibit is set. Control is then returned to the main DRP loop via block 216 where the status of the DRP inhibit flag is then checked.

While the best mode for carrying out the invention has been described in detail, those familiar with the art to which this invention pertains will recognize various alternative designs and embodiments for practicing the invention as defined by the following claims.

What is claimed is:

1. A brake pressure control method for a vehicle having a front and a rear wheel, and control means for controlling the pressure at said wheels, said method comprising a sequence of the steps of:

calculating a rear proportioning mode activation threshold as a function of predetermined vehicle parameters;

initiating a dynamic rear proportioning (DRP) mode of automatic brake pressure control of said rear wheel if the estimated vehicle speed is above a low speed limit and said activation threshold exceeds a predetermined value;

suspending said dynamic rear proportioning mode and transitioning to an active anti-lock braking (ABS) mode of automatic brake pressure control of said rear wheel upon detection of an incipient skid condition of said rear wheel;

terminating said active anti-lock mode of operation of said rear wheels and transitioning to said dynamic rear proportioning mode upon recovery of said rear wheel from said incipient skid condition;

terminating said dynamic rear proportioning mode when said value is no longer exceeded or a predetermined interval of time after said vehicle speed drops below said low speed limit.

2. The method of claim 1 for a vehicle having two front wheels and two rear wheels, wherein a transition from said DRP mode to said ABS mode is also performed upon detection of an incipient skid condition of both of said front wheels.

3. The method of claim 2 wherein said vehicle parameters include rear wheel slip and estimated vehicle deceleration and said incipient skid condition occurs at a predetermined wheel slip value and a predetermined vehicle deceleration level.

4. The method of claim 3 wherein said rear proportioning mode include at least a pressure hold phase and a pressure apply phase and enters said apply phase to force a rear wheel departure upon transition from said DRP mode to said ABS mode in response to an incipient skid condition at both of said front wheels.

5. The method of claim 2 wherein said activation threshold is calculated in accordance with the formula:

$$T = K_0 + K_{BRAKE} - K_{DRPACT} - W1*LAT\_ACCEL*AVEL/MAX\_AVEL - W2*RSLIP - W3*(VEH\_DEC - K_{MACEL}*\Sigma MACEL)$$

where:

T is the resultant activation threshold;

$K_0$ is a default or nominal offset value;

$K_{BRAKE}$ is a constant added when the vehicle brake switch is open;

$K_{DRPACT}$ is a constant value subtracted when the rear proportioning mode is active;

W1 is a factor used to weight the contribution of lateral acceleration;

LAT_ACCEL is the estimated vehicle lateral acceleration;

AVEL is the estimated vehicle speed;

MAX_AVEL is the maximum estimated vehicle speed at which LAT_ACCEL effect is increased;

W2 is a factor used to weight the contribution of the rear slip variable;

RSLIP is the estimated and filtered rear slip value;

W3 is a factor used to weight the contribution of the vehicle deceleration;

VEH_DEC is the estimated vehicle deceleration;

$K_{MACEL}$ is a scale factor and gain used on the MACEL variable contribution;

ΣMACEL is the sum of the wheel maximum acceleration values.

6. A brake pressure control method for a vehicle having front and rear wheels, and control means for controlling the pressure at said wheels, said method comprising a sequence of the steps of:

calculating a rear proportioning mode activation threshold in accordance with the formula;

$$T = K_0 + K_{BRAKE} - K_{DRPACT} -$$
$$W1*LAT\_ACCEL*AVEL/MAX\_AVEL -$$
$$W2*RSLIP - W3*(VEH\_DEC - K_{MACEL}*\Sigma MACEL)$$

where:

T is the resultant activation threshold;

$K_0$ is a default or nominal offset value;

$K_{BRAKE}$ is a constant added when the vehicle brake switch is open;

$K_{DRPACT}$ is a constant value subtracted when the rear proportioning mode is active;

W1 is a factor used to weight the contribution of lateral acceleration;

LAT_ACCEL is the estimated vehicle lateral acceleration;

AVEL is the estimated vehicle speed;

MAX_AVEL is the maximum estimated vehicle speed at which LAT_ACCEL effect is increased;

W2 is a factor used to weight the contribution of the rear slip variable;

RSLIP is the estimated and filtered rear slip value;

W3 is a factor used to weight the contribution of the vehicle deceleration;

VEH_DEC is the estimated vehicle deceleration;

$K_{MACEL}$ is a scale factor and gain used on the MACEL variable contribution;

ΣMACEL is the sum of the wheel maximum acceleration values;

initiating a rear proportioning mode of automatic brake pressure control of said rear wheels if the estimated vehicle speed is above a low speed limit and said activation threshold exceeds a predetermined value, to thereby maintain an optimum pressure to said rear wheels;

terminating said dynamic rear proportioning mode when said threshold is no longer exceeded or a predetermined interval of time after the vehicle speed drops below said low speed limit.

7. The method defined in claim 6 wherein said DRP mode is terminated and an ABS mode of brake control is initiated with respect to said rear wheels in response to both front wheels entering an ABS mode of brake control.

8. The invention defined in claim 7 wherein said activation threshold varies between zero and a maximum value and said DRP mode is initiated when the level drops below zero.

9. A brake pressure control method for a vehicle having front and rear wheels, wheel speed sensors for sensing the speed of at least one front wheel and at least one rear wheel speed, and a hydraulic brake for each wheel having a brake pressure controllable by an actuable valve, the method comprising a sequence of the following steps:

estimating vehicle speed based on sensed wheel speed;

calculating an activation threshold based on the formula;

$$T = K_0 + K_{BRAKE} - K_{DRPACT} -$$
$$W1*LAT\_ACCEL*AVEL/MAX\_AVEL -$$
$$W2*RSLIP - W3*(VEH\_DEC - K_{MACEL}*\Sigma MACEL)$$

where:

T is the resultant activation threshold;

$K_0$ is a default or nominal offset value;

$K_{BRAKE}$ is a constant added when the vehicle brake switch is open;

$K_{DRPACT}$ is a constant value subtracted when the rear proportioning mode is active;

W1 is a factor used to weight the contribution of lateral acceleration;

LAT_ACCEL is the estimated vehicle lateral acceleration;

AVEL is the estimated vehicle speed;

MAX_AVEL is the maximum estimated vehicle speed at which LAT_ACCEL effect is increased;

W2 is a factor used to weight the contribution of the rear slip variable;

RSLIP is the estimated and filtered rear slip value;

W3 is a factor used to weight the contribution of the vehicle deceleration;

VEH_DEC is the estimated vehicle deceleration;

$K_{MACEL}$ is a scale factor and gain used on the MACEL variable contribution;

ΣMACEL is the sum of the wheel maximum acceleration values;

initiating a dynamic rear proportioning (DRP) mode of brake pressure control, including the limiting of the brake pressure to at least one rear wheel, if the vehicle speed is above a predetermined speed threshold and said activation threshold value is equal to zero;

terminating said DRP mode a predetermined period of time after said vehicle speed falls below said predetermined speed threshold.

10. The method defined in claim 9 further comprising the steps of:

initiating an ABS mode of brake pressure control including the application of brake pressure to said rear wheel to force a rear wheel departure if both of said front wheels exhibits an incipient skid condition during said DRP mode.

11. A method of controlling the rear brake pressure of a vehicle having front and rear wheels, comprising a sequence of the steps of:

transitioning from an IDLE mode of operation, during which brake pressure applied to the rear brakes is under manual control, to a DRP mode of operation, during which pressure applied to the rear brakes is automatically proportioned relative to the pressure applied to the front brakes to maintain an optimum rear brake pressure based on vehicle conditions including rear wheel slip and vehicle deceleration, transitioning from said DRP mode of operation to an ABS mode of operation, in which brake pressure to the rear wheels is initially increased to force a rear wheel departure in response to and incipient skid condition at both of said front wheels, transitioning from said ABS mode of operation to said DRP mode of operation, if said ABS mode of operation is terminated prior to said vehicle coming to a complete stop, and transitioning from said DRP mode of operation to said IDLE mode of operation a predetermined interval of time after said vehicle speed drops below a predetermined speed.

12. A vehicle anti-lock braking system (ABS) for controlling the front and rear brakes of front and rear wheels respectively of a vehicle by continually forcing wheel instability in a cyclic manner tending to minimize stopping distance and maximize vehicle stability, said ABS including an integral dynamic rear proportioning (DRP) mode of operation providing control of said rear brakes during braking conditions which do not require an ABS mode of operation, comprising;

sensor means for developing input signals indicative of the speed of at least on front and one rear vehicle wheel, valve means for controlling the brake pressure to the front and rear brakes, computer means responsive to said input signals for calculating a DRP activation threshold based on predetermined vehicle parameters, said computer means providing output signals to said valve means for initiating said DRP mode if said vehicle speed is above a predetermined speed, and said activation threshold exceeds a predetermined value, said computer means providing output signals to said valve means for transitioning from said DRP mode to said ABS mode in response to an incipient skid condition of said rear wheel, for transitioning from said ABS mode to said DRP mode upon rear wheel recovery, and for terminating said DRP mode a predetermined interval of time after said vehicle speed drops below said predetermined value.

13. The system defined in claim 12 wherein said parameters include vehicle deceleration and the amount by which the rear wheel slip exceeds the front wheel slip.

14. The system defined in claim 13 wherein said parameters include lateral acceleration of the vehicle based on the difference in the speeds of undriver wheels, and the effect of vehicle lateral acceleration on said activation threshold is increased as vehicle speed increases until a predetermined vehicle speed threshold is reach, after which said effect is decreased.

15. The system defined in claim 14 wherein said vehicle deceleration is calculated by differentiating a calculated value of vehicle speed.

16. The system defined in claim 15 wherein said activation threshold is determined by assigning an initial value to a variable and decaying the variable by a weighted and limited contribution of certain of said parameters to scale the influence of the parameter on the activation of said DRP mode.

17. The system defined by claim 12 wherein said computer means includes look-up table means accessible in response to a system fault for inhibiting the DRP mode of operation under certain predetermined conditions and for maintaining a DRP keep-alive mode even in the presence of a system fault under other predetermined conditions.

18. The system defined by claim 17 wherein said computer means further includes means responsive to a wheel speed sensor fault for preventing use of the data from the associated sensor.

* * * * *